(12) United States Patent
Wu (10) Patent No.: US 12,386,822 B2
(45) Date of Patent: Aug. 12, 2025

(54) METHOD, APPARATUS, ELECTRONIC DEVICE AND STORAGE MEDIA FOR RECORDING CORRESPONDENCE RELATIONSHIPS BETWEEN TARGET AGGREGATION PATHS AND AGGREGATION RESULTS

(71) Applicant: Beijing Zitiao Network Technology Co., Ltd., Beijing (CN)

(72) Inventor: Yanchun Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/633,297

(22) Filed: Apr. 11, 2024

(65) Prior Publication Data
US 2024/0346020 A1 Oct. 17, 2024

(30) Foreign Application Priority Data
Apr. 13, 2023 (CN) .......................... 202310395797.9

(51) Int. Cl.
*G06F 16/242* (2019.01)
*G06F 16/248* (2019.01)

(52) U.S. Cl.
CPC .......... *G06F 16/244* (2019.01); *G06F 16/248* (2019.01)

(58) Field of Classification Search
CPC .............................. G06F 16/244; G06F 16/248
See application file for complete search history.

(56) References Cited

U.S. PATENT DOCUMENTS

| | | | | |
|---|---|---|---|---|
| 7,389,301 B1 * | 6/2008 | Mazzagatti | ......... | G06F 16/2246 707/999.102 |
| 2006/0294129 A1 * | 12/2006 | Stanfill | ............. | G06F 16/24556 707/999.102 |
| 2008/0059449 A1 * | 3/2008 | Webster | ................ | G06F 16/244 707/999.005 |
| 2015/0199378 A1 * | 7/2015 | Reyntjens | ................ | G06N 5/00 707/754 |

(Continued)

FOREIGN PATENT DOCUMENTS

| | | | | |
|---|---|---|---|---|
| CN | 106997386 B | * | 12/2019 | ......... G06F 16/2393 |
| CN | 111460047 A | * | 7/2020 | ........... G06F 16/288 |

(Continued)

*Primary Examiner* — Neveen Abel Jalil
*Assistant Examiner* — Hubert Cheung
(74) *Attorney, Agent, or Firm* — BakerHostetler (57) ABSTRACT

The application discloses a method, apparatus, electronic device and storage medium for data aggregation. The method includes: obtaining an aggregation basis dimension and an aggregation calculation dimension, wherein the aggregation basis dimension and the aggregation calculation dimension are respectively fields in a data source table to be aggregated; obtaining an aggregation result by aggregating field values corresponding to the aggregation calculation dimension of at least one target row, wherein field values of the aggregation basis dimension of the at least one target row are the same; and recording a correspondence relationship between a target aggregation path and the corresponding aggregation result, wherein the target aggregation path is determined according to field values of the aggregation basis dimension of the target row.

17 Claims, 5 Drawing Sheets

(56) References Cited

U.S. PATENT DOCUMENTS

2015/0363725 A1* 12/2015 Andersson ......... G06Q 10/0631
705/7.23

FOREIGN PATENT DOCUMENTS

| CN | 112445814 A | | 3/2021 | | |
|---|---|---|---|---|---|
| CN | 114880443 A | * | 8/2022 | ......... | G06F 16/2246 |
| CN | 115146141 A | | 10/2022 | | |
| CN | 115221157 A | * | 10/2022 | | |
| CN | 115544153 A | | 12/2022 | | |

* cited by examiner

METHOD, APPARATUS, ELECTRONIC DEVICE AND STORAGE MEDIA FOR RECORDING CORRESPONDENCE RELATIONSHIPS BETWEEN TARGET AGGREGATION PATHS AND AGGREGATION RESULTS

CROSS-REFERENCE

The present application claims priority to Chinese Patent Application No. 202310395797.9, filed on Apr. 13, 2023, and entitled "METHOD, APPARATUS, ELECTRONIC DEVICE AND STORAGE MEDIUM FOR DATA AGGREGATION", the entirety of which is incorporated herein by reference.

FIELD

The present disclosure belongs to computer technology field, and in particular relates to a method, apparatus, electronic device and storage medium for data aggregation.

BACKGROUND

Data Cube is a technical architecture used for data analysis and indexing. After data is analyzed by data cube, the efficiency of data query and retrieval can be greatly accelerated. However, in the process of actual application, Cube arranges and combines all dimensions in the data source, even if the combination does not exist in the data source, thereby generating a three-dimensional structure (Cuboid) composed of many redundant dimension combinations. Redundant Cuboids can cause unnecessary memory usage and performance overhead.

SUMMARY

The embodiments of the present application provide a method, apparatus, electronic device and storage medium for data aggregation, which can avoid generating aggregation dimension combinations unrelated to the data source, thereby effectively avoiding unnecessary memory usage and performance overhead.

In a first aspect, embodiments of the present application provide a data aggregation method, and the method comprises: obtaining an aggregation basis dimension and an aggregation calculation dimension, wherein the aggregation basis dimension and the aggregation calculation dimension are respectively fields in a data source table to be aggregated; obtaining an aggregation result by aggregating field values corresponding to the aggregation calculation dimension of at least one target row, wherein field values of the aggregation basis dimension of the at least one target row are the same; and recording a correspondence relationship between a target aggregation path and the corresponding aggregation result, wherein the target aggregation path is determined according to field values of the aggregation basis dimension of the target row.

In a second aspect, embodiments of the present application provide a data aggregation apparatus, and the apparatus comprises: an obtaining module for obtaining an aggregation basis dimension and an aggregation calculation dimension, wherein the aggregation basis dimension and the aggregation calculation dimension are respectively fields in a data source table to be aggregated; an aggregating module for obtaining an aggregation result by aggregating field values corresponding to the aggregation calculation dimension of at least one target row, wherein field values of the aggregation basis dimensions of the at least one target row are the same; and a recording module for recording a correspondence relationship between a target aggregation path and the corresponding aggregation result, wherein the target aggregation path is determined according to field values of the aggregation basis dimension of the target row.

In a third aspect, embodiments of the present application provide an electronic device, and the electronic device comprises a processor, a memory, and programs or instructions stored on the memory and can run on the processor, when executed by the processor, the programs or instructions implement a step of the method of the first aspect.

In a fourth aspect, embodiments of the present application provide a readable storage medium. Programs or instructions are stored on the readable storage medium. When executed by a processor, the programs or instructions implement a step of the method of the first aspect.

In the fifth aspect, embodiments of the present application provide a chip. The chip includes a processor and a communication interface. The communication interface is coupled to the processor. The processor is used to run programs or instructions to implement the method of the first aspect.

In the data aggregation method provided by the present application, first, based on the fields in the data source table, obtaining an aggregation basis dimension and an aggregation calculation dimension, and then obtaining an aggregation result by aggregating field values corresponding to the aggregation calculation dimension of at least one target row. Finally, recording a correspondence relationship between a target aggregation path determined according to field values of the aggregation basis dimension of the target row, and the corresponding aggregation result, which can avoid generating aggregation paths unrelated to the data source, thereby effectively avoiding unnecessary memory usage and performance overhead.

DETAILED DESCRIPTION

The technical solutions in the embodiments of the present application will be clearly and completely described below in conjunction with the accompanying drawings in the embodiments of the present application. Obviously, the described embodiments are part of the embodiments of the present application, rather than all the embodiments. Based on the embodiments in the present application, all other embodiments obtained by those of ordinary skill in the art without creative efforts fall within the scope of protection of the present application.

Figure 1:
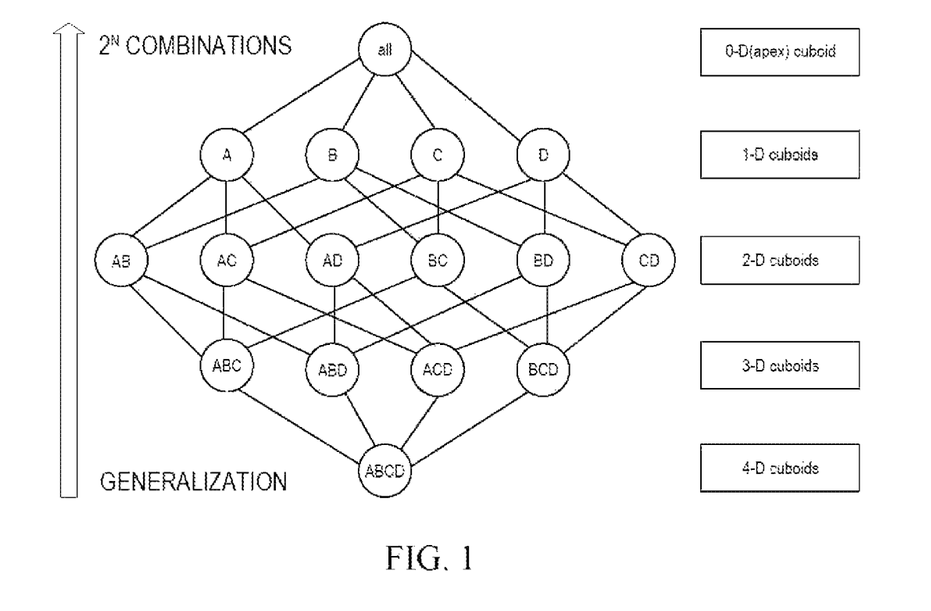
FIG. 1 is a schematic flow diagram of a data cube in the related technology.

FIG. 1 shows a data Cube in a related technology. Cube is a combination of all dimensions. Each combination of dimensions is called a dimension combination (cuboid). If there are n-dimensional cubes (nodes), then $2^n$ cuboids exist. The disadvantages of this model include:

1. Create many redundant cuboids. Cube will arrange and combine all dimensions, even if the combination does not exist in the data source.
2. Create unnecessary performance and memory overhead. Since the data cube model is a permutation and combination of all dimensions, redundant cuboids will cause unnecessary memory usage, while unnecessary traversal will also cause performance overhead.

In view of this, the present application proposes a method, apparatus, electronic device and storage medium for data aggregation.

A method, apparatus, electronic device and storage medium for data aggregation provided by the embodiments of the present application will be explained in detail below in conjunction with the accompanying drawings with specific embodiments and their application scenarios.

Figure 2:
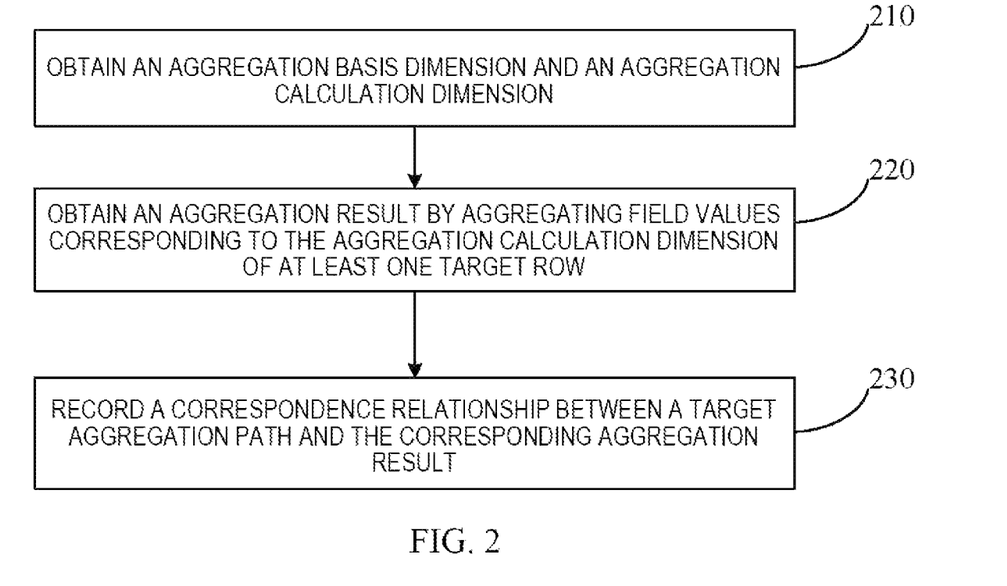
FIG. 2 is a schematic flow chart of a data aggregation method provided by embodiments of the present application.

FIG. 2 shows a data aggregation method provided by an embodiment of the present application. The method can be executed by an electronic device, and the electronic device can include: a server and/or a terminal device. In other words, the method can be executed by software or hardware installed on the electronic device, and the method includes the following steps:

Step 210: Obtain an aggregation basis dimension and an aggregation calculation dimension.

Wherein, the aggregation basis dimension and the aggregation calculation dimension are respectively fields in a data source table to be aggregated.

It can be understood that before aggregating the data in the data source table to be aggregated, it is necessary to obtain the aggregation basis dimension and the aggregation calculation dimension. The aggregation basis dimension and the aggregation calculation dimension are based on the related dimension information extracted from the data source table, where the aggregation basis dimension is generated according to the fields in the data source table, and the aggregation calculation dimension refers to the value dimension. Exemplarily, as shown in Table 1, it is the data source table to be aggregated.

TABLE 1

| Sales date | Sales province | Sales city | Color | Factory | Sales price |
|---|---|---|---|---|---|
| 2012 Mar. 13 | Sichuan | panzhihua | black | Mazda | 1 |
| 2012 May 19 | Yunnan | Kunming | black | Mazda | 10.2 |
| 2020 Dec. 21 | Gansu | Lanzhou | black | Mazda | 3 |
| 2020 Dec. 17 | Henan | Sanmenxia | yellow | Mazda | 0.5 |
| 2012 Oct. 12 | Yunnan | Kunming | black | Great Wall | 84 |
| 2020 Sep. 1 | Henan | Sanmenxia | black | Mazda | 80 |
| 2012 May 19 | Sichuan | Leshan | yellow | Hong Qi | 22 |
| 2020 Dec. 21 | Guangdong | Guangzhou | white | Buick | 22 |
| 2020 Dec. 17 | Hebei | Zaozhuang | white | BMW | 76 |
| 2012 Aug. 28 | Henan | Sanmenxia | white | Mazda | 82 |
| 2020 Oct. 29 | Heilongjiang | Mudanjiang City | black | Infiniti | 78 |
| 2020 Oct. 30 | Guangdong | Jiangmen | black | Buick | 25 |
| ... | ... | ... | ... | ... | ... |

In the above table, the fields in the title row of Table 1 include: sales date, sales province, sales city, color, factory and sales price. The aggregation basis dimension can be obtained by arranging and combining sales date, sales province, sales city, color and factory, such as "sales city-factory", "sales province-sales city-factory", etc., the aggregation calculation dimension can be sales price.

In this step, related dimension information is extracted from the data source table to be aggregated, thereby the aggregation basis dimension and aggregation calculation dimension are constructed according to the extracted dimension information. The aggregation basis dimension and aggregation calculation dimension constructed in this way are dimension combinations included in the data source table, and the dimension combinations can avoid generating dimension combinations that do not exist in the data source table.

Step 220: Obtain an aggregation result by aggregating field values corresponding to the aggregation calculation dimension of at least one target row.

Wherein, field values of the aggregation basis dimension of the at least one target row are the same.

Herein, aggregating refers to aggregating data with the same field value in the aggregation basis dimension according to specified aggregation calculation dimension. The method of aggregating includes but are not limited to computing the mean, computing the maximum value, computing the minimum value, computing the median, computing the standard deviation, computing the variance, and computing the sum.

In one implementation, step 220 may include the following steps:

Step 1: Obtaining at least one of target aggregation path by querying the data source table.

It can be understood that by traversing the data source table, obtaining the row index of the currently traversed row data, the row index can specifically indicate a certain row, and then obtaining at least one of column index of the currently traversed row data corresponding to the aggregation basis dimension, the column index refers to the field value of a certain column. Then based on the row index and column index, the field value of the specified cell is determined, and finally the target aggregation path is generated according to the obtained field value.

Exemplarily, continue to refer to the above-mentioned Table 1, traverse the row data of the data source table except the title row, first the first row of data is obtained, and its row index can be "1", or also can be "2", The present application does not specifically limit to this and can be set according to the actual situation. In this implementation, the row index of the first row of data except the title row is set to "1". Then according to the aggregation basis dimension "sales province-sales city-factory", the column index of the corresponding column is obtained sequentially. For example, the column index corresponding to "sales province" is "2", then the coordinates (1,2) represent the first row and the second column, the field value of the cell corresponding to coordinates (1,2) is "Sichuan". Similarly, the field value of the cell corresponding to "Sales city" is "Panzhihua", and the field value of the cell corresponding to "Factory" is "Mazda". According to the obtained field values, a target aggregation path of the first row of data is determined to be "Sichuan-Panzhihua-Mazda".

Step 2: Obtaining at least one aggregation result by aggregating field values corresponding to the aggregation calculation dimension of the at least one target row corresponding to one target aggregation path.

Exemplarily, taking the aggregation basis dimensions as sales province, sales city and factory, and the aggregation calculation dimension as sales price as an example, the aggregation results after aggregating can be shown as Table 2 below.

TABLE 2

| Aggregation path | Sales price summary | Sales price average |
|---|---|---|
| Sichuan-Panzhihua-Mazda | *** | *** |
| Guangdong-Guangzhou-Buick | *** | *** |
| Sichuan-Black-Mazda | *** | *** |
| 2020 Oct. 12-Black-Great Wall | *** | *** |

Herein, the sales price summary and the sales price average can be obtained by aggregating. It should be explained that the aggregation results shown in Table 2 are only examples and are not intended to limit the embodiments of the present application.

In this implementation, all target aggregation paths can be traverse obtained first, and then aggregate to obtain the aggregation results. By dividing the obtaining and aggregating of the target aggregation path into two separate modules, the structure is clear and easy to develop and manage, and it is highly scalable and can maintain many types of operations. It is also possible to aggregate every time a target aggregation path is obtained during the traversal process. In this way, there is no need to occupy a large memory to store the obtained target aggregation path, which can significantly improve processing efficiency.

Step 230: Record a correspondence relationship between a target aggregation path and the corresponding aggregation result.

Wherein, the target aggregation path is determined according to field values of the aggregation basis dimension of the target row.

Optionally, the record of the correspondence relationship between the target aggregation path and the corresponding aggregation result can be stored in the form of key-value pairs. Exemplarily, as shown in Table 1 and Table 2,

TABLE 1

| pathpool | |
|---|---|
| path | calc unit id |
| Sichuan-Panzhihua-Mazda | 0 |
| Yunnan-Kunming-Mazda | 1 |
| Gansu-Lanzhou-Mazda | 2 |
| Henan-Sanmenxia-Mazda | 3 |
| Yunnan-Kunming-Great Wall | 4 |
| ... | |

TABLE 2

| calcUnitList | |
|---|---|
| calc unit id | calc unit item |
| 0 | item object 1 |
| 1 | item object 2 |
| 2 | item object 3 |
| 3 | item object 4 |
| 5 | item object 5 |
| ... | |

Herein, path represents the target aggregation path, calc unit id represents the calculation unit identification, and calc unit item represents the corresponding aggregation result item. Employing the recording method of key-value pair further improve the control accuracy of recording correspondence relationship and further reduce data redundancy.

Optionally, in the case of predetermined conditions are met, the correspondence relationship needs to be updated, where the predetermined conditions may include: modification of the data source, modification of the configuration information of the data source table, etc. Modification of the data source may include: changing the data source, creating a new data source table, modifying the data source table, modifying the grouping of the data source table, etc.

In step 230, the correspondence relationship between the target aggregation path and the corresponding aggregation result is recorded, so that when querying the aggregation result corresponding to a certain target aggregation path, there is no need to waste time and resources for calculation, which improves query efficiency of the user.

In the data aggregation method provided by the present application, first, based on the fields in the data source table, obtaining an aggregation basis dimension and an aggregation calculation dimension, and then obtaining an aggregation result by aggregating field values corresponding to the aggregation calculation dimension of at least one target row. Finally, recording a correspondence relationship between a target aggregation path determined according to field values of the aggregation basis dimension of the target row, and the corresponding aggregation result, which can avoid generating aggregation paths unrelated to the data source, thereby effectively avoiding unnecessary memory usage and performance overhead.

In one implementation, obtaining aggregation result by aggregating field values corresponding to the aggregation calculation dimension of at least one target row comprises:

Step 1: Obtaining target field values corresponding to the aggregation basis dimension of current row of the data source table;

It can be understood that first traversing the data source table, obtaining the row index of the currently traversed row data, the row index can specifically indicate a certain row, and then obtaining at least one of column index of the currently traversed row data corresponding to the aggregation basis dimension, the column index refers to the field value of a certain column. Then based on the row index and column index, the target field value corresponding to the aggregation basis dimension is determined.

Step 2: Generating a first aggregation path based on the target field value.

Exemplarily, continue to refer to the above Table 1. For the first row of data to be aggregated, the aggregation basis dimensions: the target field values corresponding to sales province, sales city, and factory are Sichuan, Panzhihua, and Mazda, and then the first aggregation path is generated according to the aggregation basis dimensions: Sichuan-Panzhihua-Mazda. It should be explained that "Sichuan-Panzhihua-Mazda", "Sichuan-Mazda-Panzhihua", "Panzhihua-Mazda-Sichuan", "Panzhihua-Sichuan-Mazda", "Mazda-Sichuan-Panzhihua" and "Mazda-Panzhihua-Sichuan" belong to the same aggregation path.

Step 3: in response to that the first aggregation path fails to be recorded in the correspondence relationship, recording a correspondence relationship between the first aggregation path and the first aggregation result in the correspondence relationship, wherein the first aggregation result is determined according to field values of the aggregation calculation dimension of currently traversed row data.

It can be understood that after obtaining the first aggregation path, whether the first aggregation path is recorded in the correspondence relationship is queried, and after determining that the first aggregation path is not recorded in the correspondence relationship, the correspondence relationship between the first aggregation path and the first aggregation results is recorded.

Step 4: in response to that the current row is not the last row of the data source table, taking a next row of the current row as a current row and returning to step 1.

In this implementation, aggregating every time a first target aggregation path is obtained during the traversal process, and recording the correspondence relationship between the first aggregation path and the first aggregation result. In this way, there is no need to occupy a large memory to store the obtained target aggregation path, which can significantly improve processing efficiency.

In one implementation, obtaining aggregation result by aggregating field values corresponding to the aggregation calculation dimension of at least one target row further comprises:

Step 5: in response to that the first aggregation path is recorded in the correspondence relationship, obtaining a second aggregation result by aggregating processing field values of the aggregation calculation dimension of the currently traversed row data and a first aggregation result corresponding to the first aggregation path in the correspondence relationship.

It can be understood that after obtaining the first aggregation path, whether the first aggregation path is recorded in the correspondence relationship is queried, and after determining that the first aggregation path is not recorded in the correspondence relationship, the first aggregation result corresponding to the first aggregation path in the correspondence relationship is obtained, and then aggregating field value of the aggregation calculation dimension of the currently traversed row data and the first aggregation result to obtain a second aggregation result.

Step 6: updating an aggregation result corresponding to the first aggregation path in the correspondence relationship as the second aggregation result.

It can be understood that after completing aggregating, the obtained second aggregation result is updated into the correspondence relationship, that is, the aggregation result corresponding to the first aggregation path in the correspondence relationship is updated to the second aggregation result.

Step 7: in response to that the current row is not the last row of the data source table, taking a next row of the current row as a current row and returning to step 1.

In this implementation, after it is determined that the first aggregation path is recorded in the correspondence relationship, an appropriate aggregation method is employed, which improves the efficiency of aggregating while meeting actual needs.

In one implementation, the aggregation basis dimension comprises a plurality of fields of the data source table.

In this implementation, the number of fields of the data source table included in the aggregation basis dimension is not specifically set. It can be set according to actual needs, so that it can cause the generation of aggregation basis dimensions more flexible and diverse, and cause the final obtained aggregation result more complete, and able to meet actual needs.

In one implementation, the correspondence relationship comprises: a first correspondence relationship between a target aggregation path and a computing unit identity; and a second correspondence relationship between the computing unit identity and an aggregation result.

It can be understood that the computing unit identity refers to the value corresponding to the target aggregation path as the key in the first correspondence relationship, and then the computing unit identity is used as the key and the aggregation result is used as the value to form the second correspondence relationship, which only involves the operations of adding and deleting data. There is no need to design complex data models, and there is no need to specify data types for each attribute. Moreover, when adding new data dynamically, there is no need to modify the definition of the original database, which greatly improves processing efficiency.

Figure 3:
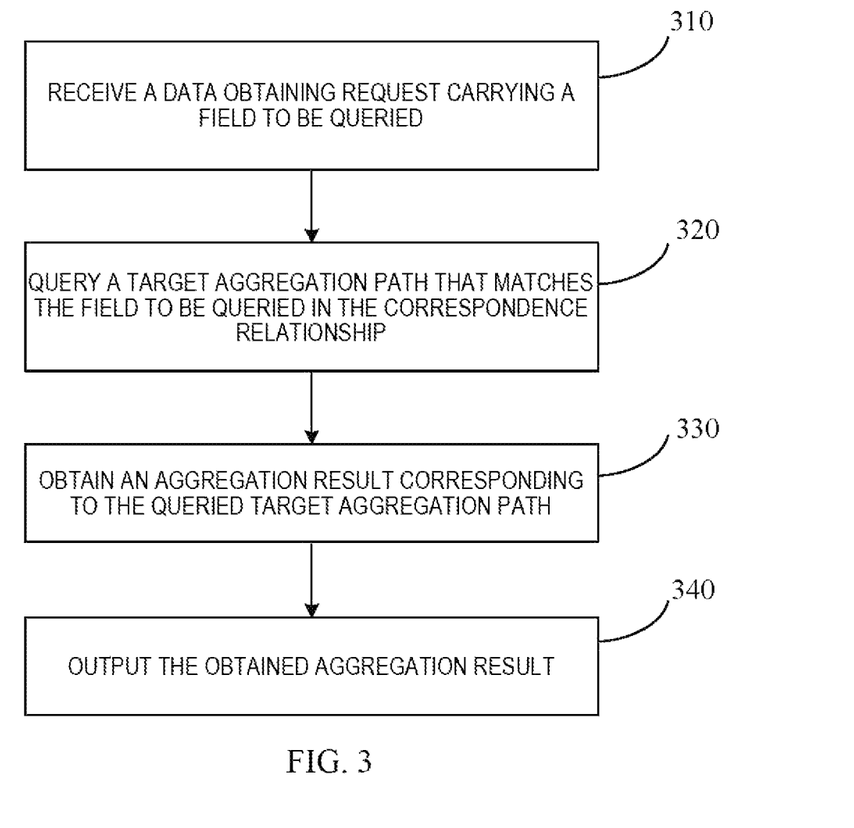
FIG. 3 is a schematic flow chart of another data aggregation method provided by embodiments of the present application.

In one implementation, as shown in FIG. 3, after recording the correspondence relationship between the each target aggregation path and the corresponding aggregation result, the method further comprises:

Step 310: Receive a data obtaining request carrying a field to be queried.

Herein, in one implementation, after receiving a data obtaining request triggered by the user, in response to the request, the carried information in the request is obtained, then the information is semantically analyzed, and the field to be queried is obtained, for example, the information carried in obtaining data request is "What is the average sales price of the Great Wall in Kunming, Yunnan", and the obtained fields to be queried after semantically analyzing are "Yunnan-Kunming-Great Wall" and "sales price average".

In another implementation, the user can select the required fields to be queried on the client.

Exemplarily, the above fields to be queried are used as an example, the user can select the three aggregation basis dimensions of Yunnan, Kunming, and Great Wall and the aggregation calculation dimension of sales price average. After completing the setting, after the server receives the data obtaining request, it will no longer semantic analyze and can directly extract the fields to be queried.

Step 320: Query a target aggregation path that matches the field to be queried in the correspondence relationship.

The fields to be queried corresponding to the data obtaining request are matched with the target aggregation path in the correspondence relationship. The specific query algorithm is not specifically limited in embodiments of the present application and can be set according to the actual situation.

Step 330: Obtain an aggregation result corresponding to the queried target aggregation path.

The aggregation result corresponding to the successfully matched target aggregation path is used as the target data corresponding to the data obtaining request.

Optionally, after the query fails, then a validity judgment is made on the fields to be queried corresponding to the data obtaining request, that is, whether the data requested by the data obtaining request can be aggregated is determined, and then according to the result of the validity judgment, determine the target data corresponding to the data obtaining request.

Step 340: Output the obtained aggregation result.

In this implementation, after receiving the data obtaining request, the corresponding aggregation result can be quickly matched for the data obtaining request, which improves the efficiency of data obtaining and reduces the time for obtaining the target data.

Figure 4:
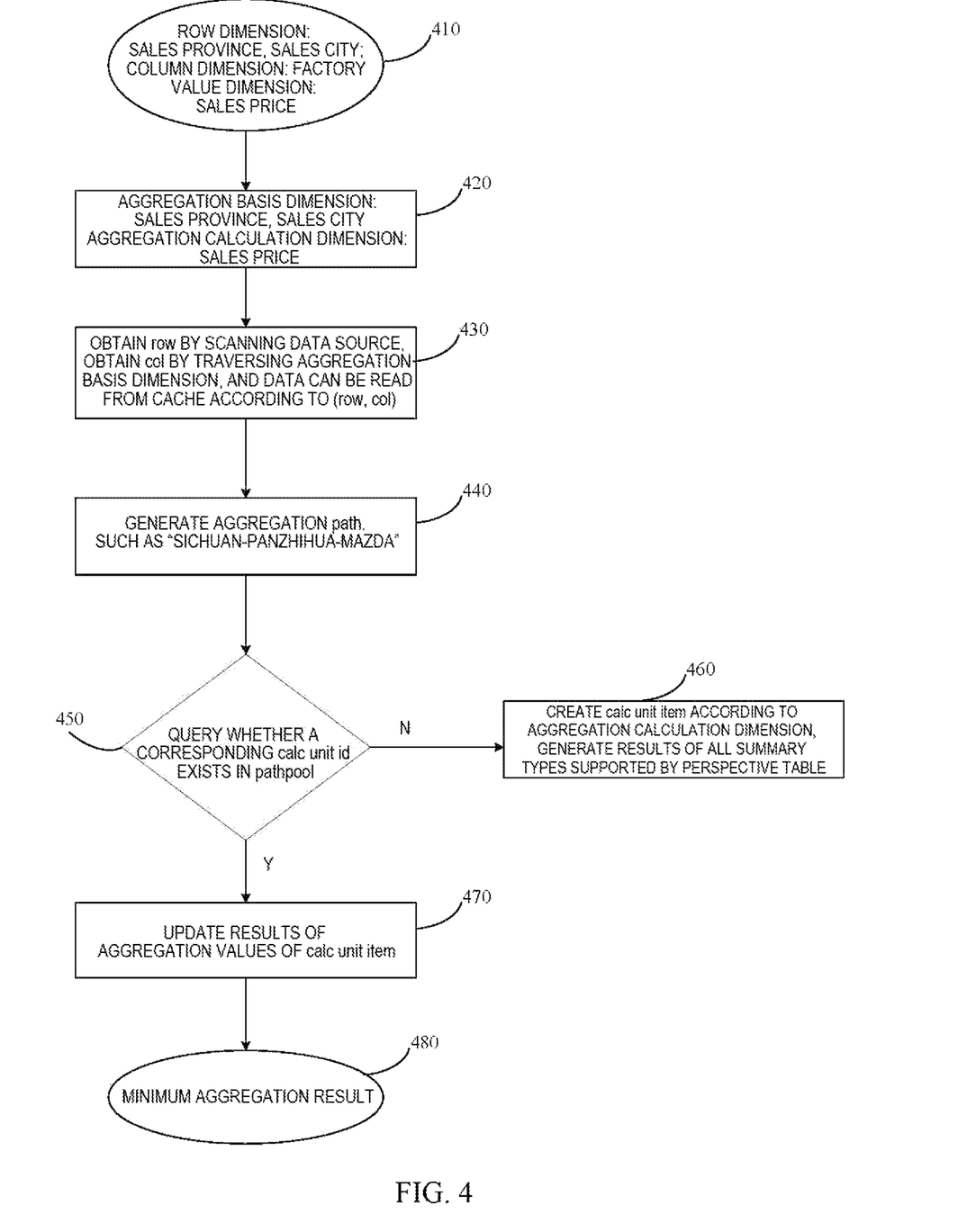
FIG. 4 is a schematic flow chart of a data aggregation method in specific application scenarios provided by embodiments of the present application.

A specific embodiment of the present application will be explained below with FIG. 4.

Specifically, the embodiments include the following steps:

Step 410: Obtain the row dimension and value dimension, continue to refer to Table 1. The row dimension can include sales province, sales city, and factory, and the value dimension can be sales price.

Step 420: Generate an aggregation basis dimension and an aggregation calculation dimension, where the aggregation basis dimensions include: sales province, sales city, and factory, and the aggregation calculation dimensions include: sales price.

Step 430: Traverse the data of pivot cache (data model describing the data source) and process each data, the index of each data is row index. When processing each data, traversing the aggregation basis dimension is needed, and the col index (column index) of the data source is obtained from pivot cache according to the dimension. Finally, according to the row index and col index, a point (row, col) can be confirmed in a two-dimensional coordinate, that is, the cell data in the two-dimensional data source can be read.

Step 440: After traversing the aggregation basis dimensions, the complete path corresponding to the piece of data can be obtained, and the path is used as the key of the aggregation result.

Step 450: Query whether a calc unit (calculation unit) exists in the pathPool (aggregation pool) according to the path. If it does not exist, then go to step 460, if it exists, then go to step 470.

Step 460: Create a new calc unit according to the aggregate calculation dimension, and write into calcUnitList, and update the reference pool of pathPool.

Step 470: Read the calc unit id from pathPool, and get the target aggregation result from calcUnitList according to the calc unit id. Aggregate the field values of the aggregation calculation dimension of the currently traversed row data and the target aggregation result to obtain the third aggregation. Finally, the third aggregation result is used to update the result of the corresponding calc unit item aggregation value.

Step 480: After traversing the data of the pivot cache, the calc units of all paths are obtained, forming all the minimum aggregation results of the aggregation basis dimensions.

Herein, the set of minimum aggregation results constitutes the minimum computing unit of the perspective engine.

Herein, in one implementation, the construction of the perspective aggregation engine can include the following parameters:

```
export interface QueryCube {
    indexOrder: IIndexOrder[ ];
    _indexList: number[ ][ ];
    _pathPool: IPathPool;
    _itemList: {
        path: string[ ];
        type: PivotCacheDataType[ ];
        unit: IItemUnit;
        sortPriorityMap: Record<number, number>,
    }[ ];
    measureIndexes: ICubeMeasure[ ];
};
```

It should be explained that indexOrder describes the ordered Dimsion dimension. The order is in the order of creation; _indexList describes the mapping relationship between the id corresponding to each calc unit and the data source row number row set, which is configured to support drill-down; _pathPool describes the mapping relationship between path generated by the aggregation basis dimension and calc unit id; _itemList describes all calc unit lists generated by aggregation basis dimensions, and the array subscript is calc unit id; measure Indexes describes created all value dimension Measure lists, as well as all aggregate calculation summary types supported by the perspective engine.

In the above embodiments, the construction of a perspective aggregation engine is implemented. The perspective aggregation engine can not only be provided to use for data perspective tables, but can also be used for querying with Query function.

Figure 5:
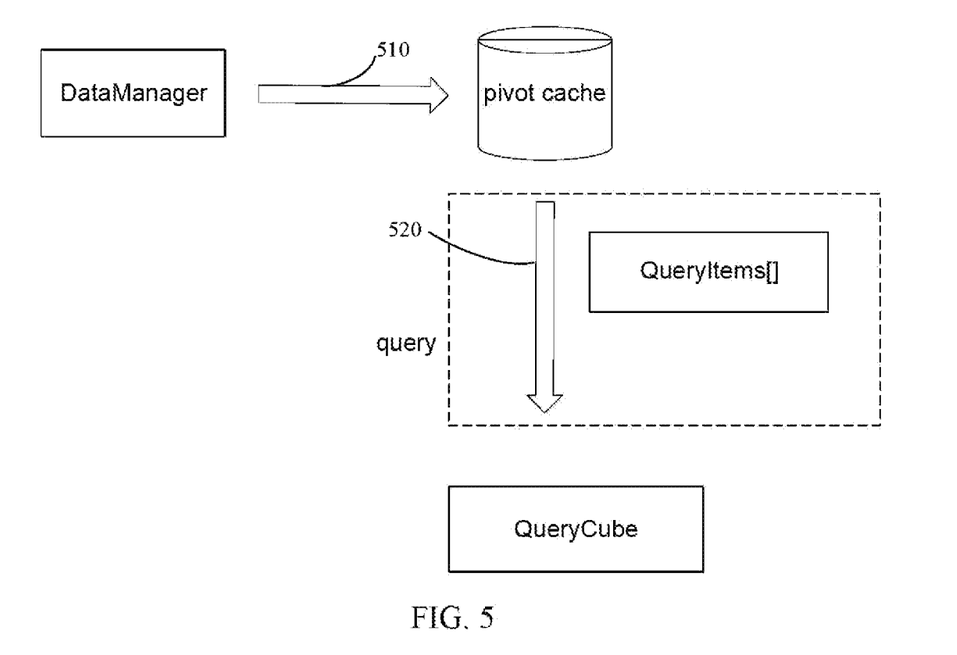
FIG. 5 is a schematic flow chart of another data aggregation method in specific application scenarios provided by embodiments of the present application.

Another specific embodiment of the present application will be explained below with FIG. 5. Specifically, the embodiments include the following steps:

Step 510: Generate pivot cache according to data source and dimension information.

Step 520: Generate, by the perspective aggregation engine, the minimum aggregation results of all Measures (value measurement dimension) and all summary types of the perspective table according to the pivot cache. For example, the perspective aggregation engine can employ the method shown in FIG. 2 to FIG. 4 above to obtain the minimum aggregation results, that is, the foregoing correspondence relationship between the aggregation path and the aggregation result, for example, the content shown in the foregoing Table 1 and Table 2.

In the foregoing embodiments, the entire process of data query by the perspective aggregation engine is implemented.

Figure 6:
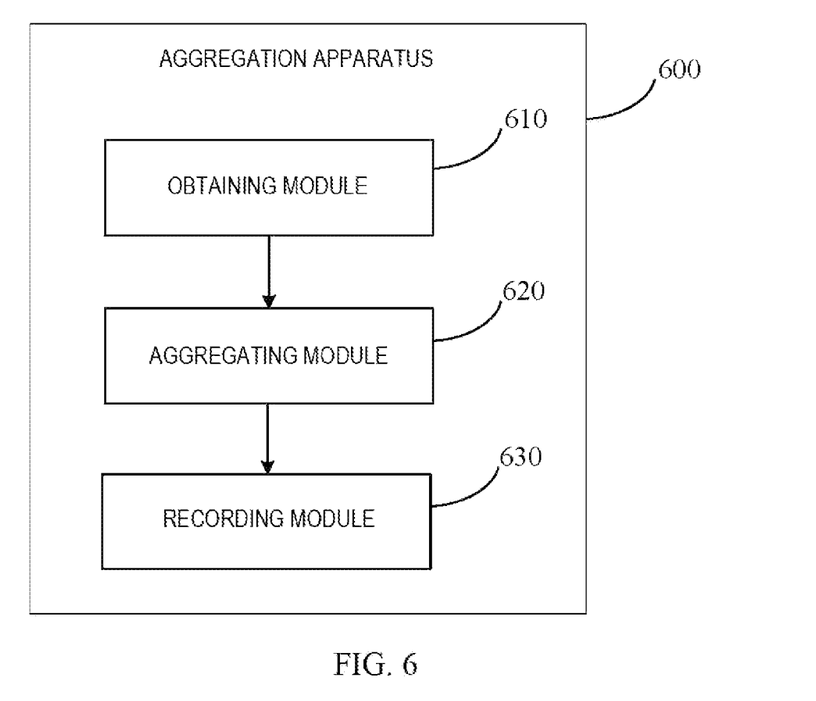
FIG. 6 is a schematic structural diagram of a data aggregation apparatus provided by embodiments of the present application.

FIG. 6 shows a schematic structural diagram of a data aggregation apparatus provided by an embodiment of the present application, as shown in FIG. 5, the data aggregation apparatus 600 may include: an obtaining module 610, an aggregating module 620, and a recording module 630.

The obtaining module 610 is configured to an aggregation basis dimension and an aggregation calculation dimension, wherein the aggregation basis dimension and the aggregation calculation dimension are respectively fields in a data source table to be aggregated; the aggregating module 620 is configured to obtain an aggregation result by aggregating field values corresponding to the aggregation calculation dimension of at least one target row, wherein field values of the aggregation basis dimensions of the at least one target row are the same; the recording module 630 is configured to record a correspondence relationship between a target aggregation path and the corresponding aggregation result, wherein the target aggregation path is determined according to field values of the aggregation basis dimension of the target row.

A data aggregation apparatus provided by the embodiments of the present application can implement each process implemented in the method embodiments shown in FIG. 1. To avoid repetition, it will not be described again here.

The data aggregation apparatus in the embodiments of the present application may be an apparatus, or may be a component, integrated circuit, or chip in an electronic device. The embodiments of the present application will not specifically limite.

The data aggregation apparatus in the embodiments of the present application may be an apparatus having an operating system. The operating system can be an Android operating system, can be an ios operating system, or can be other possible operating systems. The embodiments of the present application will not specifically limite.

Figure 7:
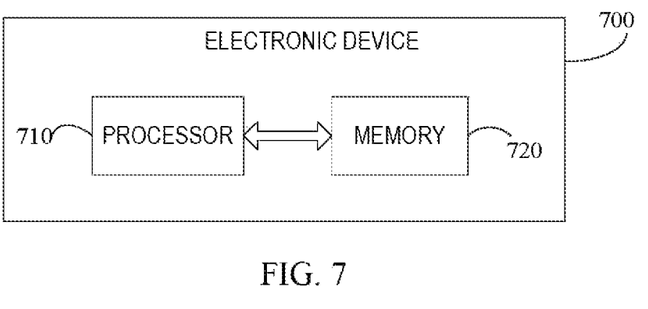
FIG. 7 is a schematic structural diagram of an electronic device provided by embodiments of the present application.

Optionally, as shown in FIG. 7, embodiments of the present application also provide an electronic device 700, including a processor 710, a memory 720, and programs or instructions stored on the memory 720 and can run on the processor 710. When the program or instruction is executed by the processor 710, each process of the foregoing data aggregation method embodiments is implemented, and the same technical effect can be achieved. To avoid repetition, it will not be described again here.

The embodiments of the present application also provide a readable storage medium. The readable storage medium stores programs or instructions thereon. When the program or instructions are executed by the processor, each process of the foregoing data aggregation method embodiments is implemented, and the same technical effect can be achieved. To avoid repetition, it will not be described again here.

Herein, the processor is the processor in the electronic device of the foregoing embodiments. The readable storage medium includes computer readable storage media, such as computer read-only memory (ROM), random access memory (RAM), magnetic disk or optical disk, etc.

The embodiments of the present application also provide a chip. The chip includes a processor and a communication interface. The communication interface is coupled to the processor. The processor is used to run programs or instructions to implement each process of the foregoing data aggregation method embodiments. To avoid repetition, it will not be described again here.

It should be understood that the chips mentioned in the embodiments of this application can also be called system-on-chip, system-on-a-chip, system-on-a-chip or system-on-chip.

It should be explained that, herein, the terms "comprising", "including" or any other variation thereof are intended to cover a non-exclusive inclusion, such that a process, method, item or apparatus that includes a series of elements not only includes those elements, and it also includes other elements not expressly listed or inherent in the process, method, item or apparatus. Without further limitation, an element defined by the statement "comprises a . . . " does not exclude the presence of additional identical elements in a process, method, item, or apparatus that includes that element. In addition, it should be pointed out that the scope of the method and apparatus of the embodiments of the present application is not limited to performing functions in the order shown or discussed, but may also include performing functions in a substantially simultaneous manner or in reverse order according to the functions involved. For example, the methods described may be performed in an order different from that described, and various steps may be added, omitted, or combined. Additionally, features described with reference to certain examples may be combined in other examples.

With the above description of the embodiments, those skilled in the art can clearly understand that the above embodiments method can be implemented by means of software and the necessary general hardware platform. Of course, it can also be implemented by hardware, but in many cases the former is a better implementation. Based on this understanding, the technical solution of the present application can be embodied in the form of a software product in essence or that contributes to the existing technology. The computer software product is stored in a storage medium (such as ROM/RAM, disk, CD), including several instructions to cause a terminal (which can be a mobile phone, computer, server, air conditioner, or network device, etc.) to perform the methods of each embodiment of the present application.

The embodiments of the present application are described above in conjunction with the accompanying drawings. However, the present application is not limited to the above specific embodiments. The forgoing specific embodiment is only illustrative and not limited. Those of ordinary skill in the art can make many forms under the inspiration of the present application, without departing from the purpose of the present application and the protection scope of the claims, all of the forms fall within the protection of the present application.

I claim:

1. A method of reducing data redundancy and improving query efficiency, comprising:
generating a pivot cache based on a data source table;
traversing the pivot cache to obtain an aggregation basis dimension and an aggregation calculation dimension, wherein the aggregation basis dimension comprises a combination of at least two fields, and the aggregation calculation dimension comprises a field different from the at least two fields;
identifying a target aggregation path based on field values of the at least two fields of the aggregation basis dimension, wherein the target aggregation path is related to at least one target row, and wherein each of the at least one target row comprises the same field values in the at least two fields;
generating an aggregation result by aggregating field values corresponding to the aggregation calculation dimension of the target aggregation path;
generating and storing a correspondence relationship between the target aggregation path and a corresponding aggregation result in a form of key-value pairs, wherein the generating a correspondence relationship between the target aggregation path and a corresponding aggregation result in a form of key-value pairs comprises:
creating a first correspondence relationship between the target aggregation path and a computing unit identity, and
creating a second correspondence relationship between the computing unit identity and the corresponding aggregation result, wherein the computing unit identity serves as a key in the second correspondence relationship, and the corresponding aggregation result serves as a value in the second correspondence relationship; and
executing a query based on the stored correspondence relationship from the created first correspondence relationship and the created second correspondence relationship to improve query efficiency.

2. The method of claim 1, wherein generating the aggregation result by aggregating field values corresponding to the aggregation calculation dimension of the at least one target row comprises:
obtaining at least one aggregation result by aggregating field values corresponding to the aggregation calculation dimension of the at least one target row corresponding to the target aggregation path.

3. The method of claim 1, wherein generating the aggregation result by the aggregating field values corresponding to the aggregation calculation dimension of the at least one target row comprises:
step 1: obtaining target field values corresponding to the aggregation basis dimension of current row of the data source table;
step 2: generating a first aggregation path based on the target field value;

step 3: in response to that the first aggregation path fails to be recorded in the correspondence relationship, recording a correspondence relationship between the first aggregation path and the first aggregation result in the correspondence relationship, wherein the first aggregation result is determined according to field values of the aggregation calculation dimension of currently traversed row data;

step 4: in response to that the current row is not the last row of the data source table, taking a next row of the current row as a current row and returning to step 1.

4. The method of claim 3, wherein generating the aggregation result by aggregating field values corresponding to the aggregation calculation dimension of the at least one target row further comprises:

step 5: in response to that the first aggregation path is recorded in the correspondence relationship, obtaining a second aggregation result by aggregating processing field values of the aggregation calculation dimension of the currently traversed row data and a first aggregation result corresponding to the first aggregation path in the correspondence relationship;

step 6: updating an aggregation result corresponding to the first aggregation path in the correspondence relationship as the second aggregation result;

step 7: in response to that the current row is not the last row of the data source table, taking a next row of the current row as a current row and returning to step 1.

5. The method of claim 1, wherein the aggregation basis dimension comprises a plurality of fields of the data source table.

6. The method of claim 1, wherein the method further comprises, after recording the correspondence relationship between the target aggregation path and the corresponding aggregation result:

receiving a data obtaining request carrying a field to be queried;

querying a target aggregation path that matches the field to be queried in the correspondence relationship;

obtaining an aggregation result corresponding to the queried target aggregation path; and outputting the obtained aggregation result.

7. An electronic device of reducing data redundancy and improving query efficiency, comprising a processor, a memory, and programs or instructions stored on the memory and can run on the processor, when executed by the processor, the programs or instructions implement acts comprising:

generating a pivot cache based on a data source table;

traversing the pivot cache to obtain an aggregation basis dimension and an aggregation calculation dimension, wherein the aggregation basis dimension comprises a combination of at least two fields, and the aggregation calculation dimension comprises a field different from the at least two fields;

identifying a target aggregation path based on field values of the at least two fields of the aggregation basis dimension, wherein the target aggregation path is related to at least one target row, and wherein each of the at least one target row comprises the same field values in the at least two fields;

generating an aggregation result by aggregating field values corresponding to the aggregation calculation dimension of the target aggregation path;

generating and storing a correspondence relationship between the target aggregation path and a corresponding aggregation result in a form of key-value pairs, wherein the generating a correspondence relationship between the target aggregation path and a corresponding aggregation result in a form of key-value pairs comprises:

creating a first correspondence relationship between the target aggregation path and a computing unit identity, and creating a second correspondence relationship between the computing unit identity and the corresponding aggregation result, wherein the computing unit identity serves as a key in the second correspondence relationship, and the corresponding aggregation result serves as a value in the second correspondence relationship; and executing a query based on the stored correspondence relationship from the created first correspondence relationship and the created second correspondence relationship to improve query efficiency.

8. The electronic device of claim 7, wherein generating the aggregation result by aggregating field values corresponding to the aggregation calculation dimension of the at least one target row comprises:

obtaining at least one aggregation result by aggregating field values corresponding to the aggregation calculation dimension of the at least one target row corresponding to the target aggregation path.

9. The electronic device of claim 7, wherein generating the aggregation result by the aggregating field values corresponding to the aggregation calculation dimension of the at least one target row comprises:

step 1: obtaining target field values corresponding to the aggregation basis dimension of current row of the data source table;

step 2: generating a first aggregation path based on the target field value;

step 3: in response to that the first aggregation path fails to be recorded in the correspondence relationship, recording a correspondence relationship between the first aggregation path and the first aggregation result in the correspondence relationship, wherein the first aggregation result is determined according to field values of the aggregation calculation dimension of currently traversed row data;

step 4: in response to that the current row is not the last row of the data source table, taking a next row of the current row as a current row and returning to step 1.

10. The electronic device of claim 9, wherein generating the aggregation result by aggregating field values corresponding to the aggregation calculation dimension of the at least one target row further comprises:

step 5: in response to that the first aggregation path is recorded in the correspondence relationship, obtaining a second aggregation result by aggregating processing field values of the aggregation calculation dimension of the currently traversed row data and a first aggregation result corresponding to the first aggregation path in the correspondence relationship;

step 6: updating an aggregation result corresponding to the first aggregation path in the correspondence relationship as the second aggregation result;

step 7: in response to that the current row is not the last row of the data source table, taking a next row of the current row as a current row and returning to step 1.

11. The electronic device of claim 7, wherein the aggregation basis dimension comprises a plurality of fields of the data source table.

12. The electronic device of claim 7, wherein the acts further comprise, after recording the correspondence relationship between the each target aggregation path and the corresponding aggregation result:
  receiving a data obtaining request carrying a field to be queried;
  querying a target aggregation path that matches the field to be queried in the correspondence relationship;
  obtaining an aggregation result corresponding to the queried target aggregation path; and
  outputting the obtained aggregation result.

13. A non-transitory readable storage medium, comprising storing programs or instructions on the non-transitory readable storage medium, when executed by a processor, the programs or instructions implement acts comprising:
  generating a pivot cache based on a data source table;
  traversing the pivot cache to obtain an aggregation basis dimension and an aggregation calculation dimension, wherein the aggregation basis dimension comprises a combination of at least two fields, and the aggregation calculation dimension comprises a field different from the at least two fields;
  identifying a target aggregation path based on field values of the at least two fields of the aggregation basis dimension, wherein the target aggregation path is related to at least one target row, and wherein each of the at least one target row comprises the same field values in the at least two fields;
  generating an aggregation result by aggregating field values corresponding to the aggregation calculation dimension of the target aggregation path;
  generating and storing a correspondence relationship between the target aggregation path and a corresponding aggregation result in a form of key-value pairs, wherein the generating a correspondence relationship between the target aggregation path and a corresponding aggregation result in a form of key-value pairs comprises:
  creating a first correspondence relationship between the target aggregation path and a computing unit identity, and
  creating a second correspondence relationship between the computing unit identity and the corresponding aggregation result, wherein the computing unit identity serves as a key in the second correspondence relationship, and the corresponding aggregation result serves as a value in the second correspondence relationship; and
  executing a query based on the stored correspondence relationship from the created first correspondence relationship and the created second correspondence relationship to improve query efficiency.

14. The non-transitory readable storage medium of claim 13, wherein generating the aggregation result by aggregating field values corresponding to the aggregation calculation dimension of the at least one target row comprises:
  obtaining at least one aggregation result by aggregating field values corresponding to the aggregation calculation dimension of the at least one target row corresponding to the target aggregation path.

15. The non-transitory readable storage medium of claim 13, wherein generating the aggregation result by the aggregating field values corresponding to the aggregation calculation dimension of the at least one target row comprises:
  step 1: obtaining target field values corresponding to the aggregation basis dimension of current row of the data source table;
  step 2: generating a first aggregation path based on the target field value;
  step 3: in response to that the first aggregation path fails to be recorded in the correspondence relationship, recording a correspondence relationship between the first aggregation path and the first aggregation result in the correspondence relationship, wherein the first aggregation result is determined according to field values of the aggregation calculation dimension of currently traversed row data;
  step 4: in response to that the current row is not the last row of the data source table, taking a next row of the current row as a current row and returning to step 1.

16. The non-transitory readable storage medium of claim 15, wherein generating the aggregation result by aggregating field values corresponding to the aggregation calculation dimension of the at least one target row further comprises:
  step 5: in response to that the first aggregation path is recorded in the correspondence relationship, obtaining a second aggregation result by aggregating processing field values of the aggregation calculation dimension of the currently traversed row data and a first aggregation result corresponding to the first aggregation path in the correspondence relationship;
  step 6: updating an aggregation result corresponding to the first aggregation path in the correspondence relationship as the second aggregation result;
  step 7: in response to that the current row is not the last row of the data source table, taking a next row of the current row as a current row and returning to step 1.

17. The non-transitory readable storage medium of claim 13, wherein the aggregation basis dimension comprises a plurality of fields of the data source table.

* * * * *